United States Patent
Crevasse et al.

(10) Patent No.: US 6,514,123 B1
(45) Date of Patent: Feb. 4, 2003

(54) SEMICONDUCTOR POLISHING PAD ALIGNMENT DEVICE FOR A POLISHING APPARATUS AND METHOD OF USE

(75) Inventors: Annette M. Crevasse, Apopka, FL (US); William G. Easter, Orlando, FL (US); John A. Maze, Clermont, FL (US); Frank Miceli, Orlando, FL (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/718,935

(22) Filed: Nov. 21, 2000

(51) Int. Cl.⁷ .................................................. B24B 1/00
(52) U.S. Cl. ......................... 451/28; 451/41; 451/285; 451/286; 451/458; 451/914
(58) Field of Search ................................. 451/285–289, 451/41, 28, 458, 914, 921; 82/151, 17, 152, 115; 269/303–306, 315

(56) References Cited

U.S. PATENT DOCUMENTS

| | | | | |
|---|---|---|---|---|
| 2,526,987 A | * | 10/1950 | Wilson | 100/219 |
| 5,299,393 A | * | 4/1994 | Chandler et al. | 451/285 |
| 5,647,792 A | * | 7/1997 | Katsuoka et al. | 451/285 |
| 5,692,666 A | * | 12/1997 | Dallas | 227/154 |
| 5,871,390 A | * | 2/1999 | Pant et al. | 451/5 |
| 5,901,763 A | * | 5/1999 | You | 144/286.1 |
| 6,092,978 A | * | 7/2000 | Fischer | 269/13 |
| 6,238,270 B1 | * | 5/2001 | Robinson | 451/41 |
| 6,276,676 B1 | * | 8/2001 | Martinez et al. | 269/305 |

* cited by examiner

Primary Examiner—George Nguyen

(57) ABSTRACT

The present invention provides a polishing pad alignment device having an alignment member positionable against a side wall of a platen. The height of the alignment member is sufficient to extend above a top surface of the platen when positioned against the wall of the platen. In one embodiment, the alignment member is an arcuate member having an arc substantially equal to an arc of the platen. In another embodiment, the alignment member is removably attachable to the wall of the platen and the polishing pad alignment member further includes an attachment device configured to attach the alignment member to the platen.

13 Claims, 5 Drawing Sheets

SEMICONDUCTOR POLISHING PAD ALIGNMENT DEVICE FOR A POLISHING APPARATUS AND METHOD OF USE

TECHNICAL FIELD OF THE INVENTION

The present invention is directed, in general, to polishing pad alignment device and method and, more specifically, to a polishing pad alignment device for semiconductor wafer polishing pads and method of use for the chemical mechanical planarization of semiconductor wafers.

BACKGROUND OF THE INVENTION

Chemical/mechanical polishing (CMP) is an essential process in the manufacture of semiconductor chips today and is becoming more critical as device sizes continue to shrink into the lower submicron ranges. Because of the high capital expense in a clean room and the high cost of manufacture, chip failures due to manufacturing defects and system down time must be minimized. Combined with seemingly, ever-falling chip prices, quality control during all phases of chip manufacture is of the highest priority.

The conventional CMP process has been developed for providing smooth topographies of the semiconductor wafers for subsequent lithography and material deposition. The CMP process can be used for planarizing: (a) insulator surfaces, such as silicon oxide or silicon nitride, deposited by chemical vapor deposition; (b) insulating layers, such as glasses deposited by spin-on and reflow deposition means, over semiconductor devices; or (c) metallic conductor interconnection wiring layers. Semiconductor wafers may also be planarized to: control layer thickness, sharpen the edge of via "plugs", remove a hardmask, remove other material layers, etc. Typically, a given semiconductor wafer may be planarized several times, such as upon completion of each metal layer.

Referring now to FIG. 1, illustrated is a sectional view of a conventional semiconductor wafer polishing apparatus 100 comprising a drive shaft 160, a platen 170, a polishing pad 172, a conventional semiconductor wafer 190, a wafer backing pad 120, and a carrier head 110. One who is skilled in the art is familiar with the operation of the conventional semiconductor wafer polishing apparatus 100.

As is well known, the CMP process involves holding and rotating a thin, reasonably flat, semiconductor wafer 190 against a rotating, polishing surface. The polishing surface is conventionally a polyurethane pad (polishing pad 172) affixed to the platen 170. During the CMP process, the polishing pad 172 becomes clogged with slurry and polishing by-products. Typically, the polishing pad 172 is re-conditioned several times before being discarded. However, the polishing pad 172 must be replaced after a predetermined significant number of wafers have been planarized due to wear and deterioration. Second, the polishing pad 172 must be replaced whenever a wafer 190 breaks, as a broken wafer contaminates the polishing environment with silicon. Of course, the removal and replacement process of the misaligned polishing pad 172 is very time consuming, resulting in down time for the CMP apparatus and significant labor costs and lost production.

In conventional processes, when replacing the polishing pad 172, the operator must align the outer circumference of the polishing pad 172 with the platen 170 in order that the polishing pad 172 is centered on the platen 170. Depending on the operator's dexterity and size, this may be time consuming. Also, after the operator aligns the pad, the operator has to hold the polishing pad 172 down while, at the same time, peeling the plastic backing off the polishing pad 172 in order to expose the adhesive and paste the polishing pad 172 onto the platen 170. During this operation, the polishing pad 172 may slip out of alignment several times. Consequently, the operator may have to repeatedly realign the polishing pad 172 with the platen 170 before the polishing pad 172 is successfully stuck onto the platen 170.

Additionally, because adhering the polishing pad 172 onto the platen 170 is done manually, alignment of the polishing pad 172 may vary as a function of human error. As consistency of the polishing environment is a high priority to maintain extremely precise CMP processes from wafer to wafer, this variation is undesirable. Moreover, if the polishing pad 172 is inadvertently misaligned and stuck to the platen 170, it must then be moved, which not only destroys the polishing pad 172 but also increases down time and cost in materials.

Accordingly, what is needed in the art is an apparatus and method that remedies the deficiencies associated with these conventional methods.

SUMMARY OF THE INVENTION

To address the above-discussed deficiencies of the prior art, the present invention provides a polishing pad alignment device having an alignment member positionable against a side wall of a platen. The height of the alignment member is sufficient to extend above a top surface of the platen when positioned against the wall of the platen. In one embodiment, the alignment member is an arcuate member having an arc substantially equal to an arc of the platen. In another embodiment, the alignment member is removably attachable to the wall of the platen, and the polishing pad alignment member further includes an attachment device configured to attach the alignment member to the platen. In one aspect of this embodiment, the attachment device is a pin coupled to a wall of the polishing pad alignment member, the pin being configured to be cooperatively received in a corresponding pin receptacle in the wall of the platen when the polishing pad alignment member is positioned against the wall of the platen. In another aspect of this embodiment, the polishing pad alignment device is metal and the attachment device is a magnet that magnetically retains the polishing pad alignment device against the wall of the platen. In yet another aspect of this embodiment, the attachment device is a latch that cooperatively engages a corresponding latch receptacle on the wall of the platen.

In another embodiment, the polishing pad alignment device includes a retractor device that couples the polishing pad alignment device to the platen. The retractor device includes a counter-balance weight attachable to the wall of the platen on an opposing side of the platen. In one aspect of this embodiment, the retractor device is a piston, a hinge, or a slide arm with a cooperative eyelet and retaining bolt.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
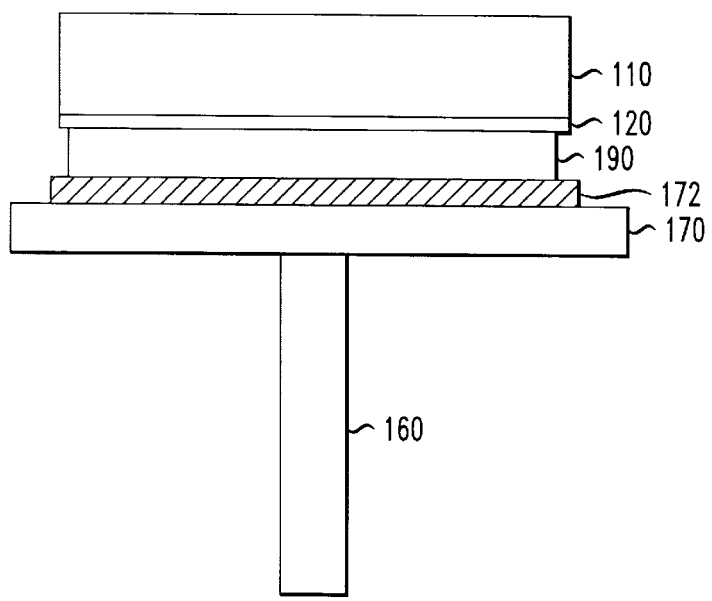
FIG. 1 illustrates a sectional view of a conventional semiconductor wafer polishing apparatus.
Figure 2:
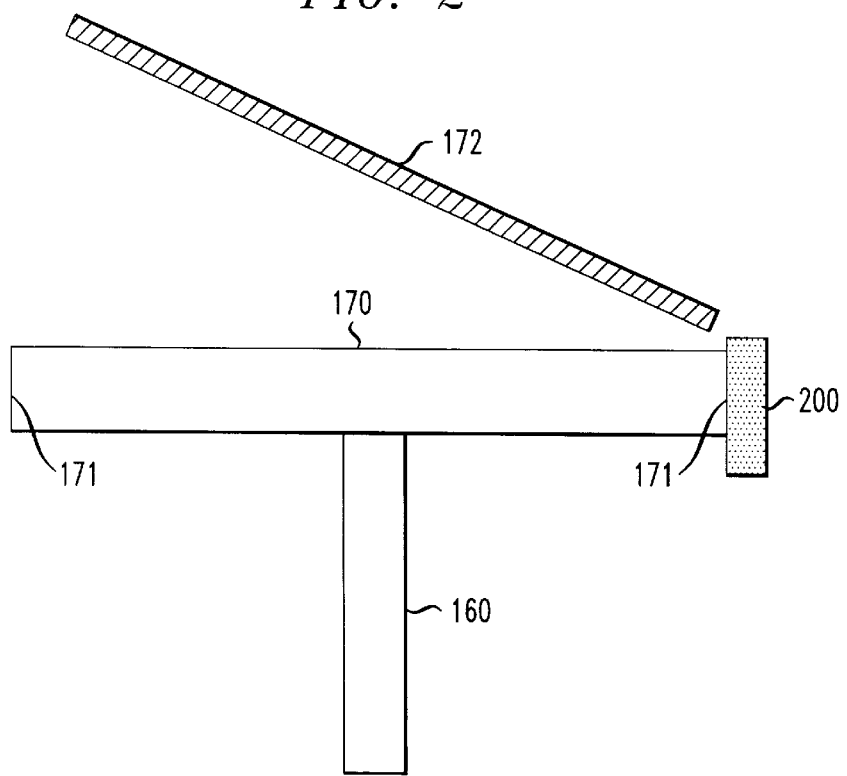
FIG. 2 illustrates a sectional view of a alignment member constructed according to the principles of the present invention, where the polishing pad of FIG. 1 is being aligned against the alignment member.

Referring now to FIG. 2, illustrated is a sectional view of an alignment member 200 constructed according to the principles of the present invention. In this particular figure, the polishing pad 172 of FIG. 1 is shown being aligned with the alignment member 200. The polishing pad alignment device of the present invention has an alignment member 200 that can be positioned against a wall 171 of the platen 170. As seen in FIG. 2, the alignment member 200 has a height that is sufficient to extend above the platen 170 such that at least a portion of the thickness of the polishing pad 172 may be able to engage the alignment member 200. In one advantageous embodiment, the height of the alignment member 200 extends at least to the extent of the thickness of the polishing pad 172. It should be understood, of course, that the height of the alignment member 200 may extend further, if desired. As discussed below, the alignment member 200 may be positioned and retained against the platen 170 in a number of ways. For example, one embodiment provides that the alignment member 200 may simply be held in by one technician while another technician aligns the polishing pad 172 against the platen 170 and secures the polishing pad 172 onto as the platen 170. The alignment member 200 may be constructed from a number of materials that have a rigidity that is sufficient to position the polishing pad 172 against it with out bending and defeating its alignment function. For example, the alignment member 200 may be comprised of metal, plastic, cardboard, or composite materials.

Figure 3:
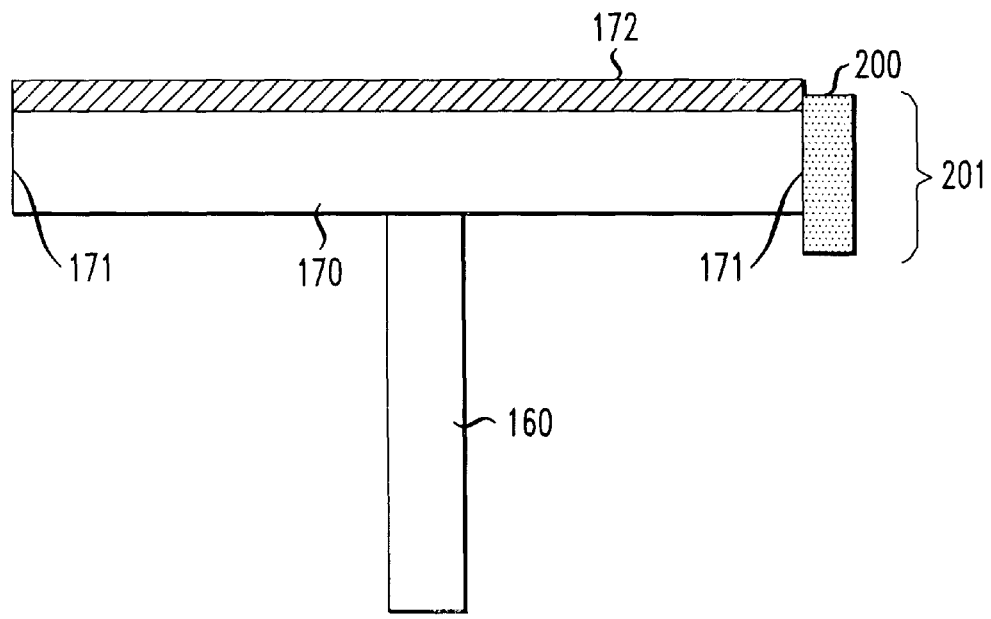
FIG. 3 illustrates a plan view of the alignment member and the attached polishing pad.

Referring now to FIG. 3, illustrated is a plan view of the polishing pad 172 attached to the platen 170. As shown in this figure, the height of the alignment member 200 is sufficient to extend above a top surface of the platen 170 when positioned against the wall of the platen 171.

Figure 4:
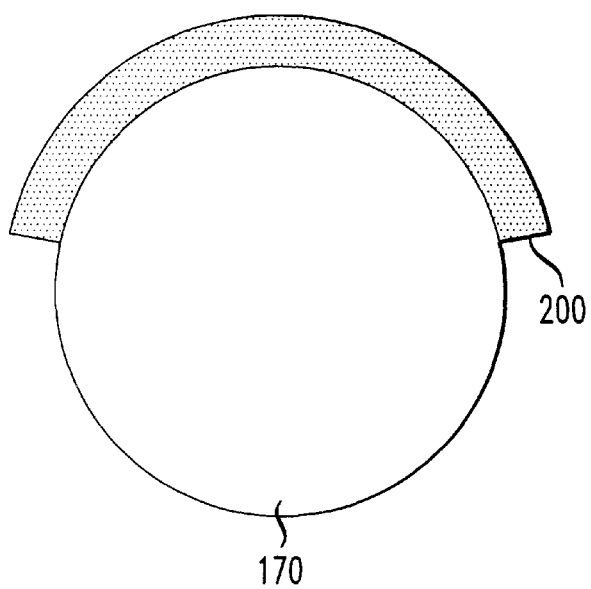
FIG. 4 illustrates an isometric view of the alignment member positioned against the platen.

Referring now to FIG. 4, illustrated is a particularly advantageous embodiment of the present invention where the alignment member 200 has an arcuate configuration having an arc substantially equal to an arc of the platen 170. The arcuate shape of the alignment member 200 facilitates the alignment of the polishing pad 172 against the alignment member 200. While the arcuate configuration has been illustrated, it should be understood that the arcuate configuration is not necessary. For example, the alignment member 200 may be flat and still be within the scope of the present invention. While one arcuate member is illustrated, it should be understood that more than one arcuate member may be used to align the polishing pad 172 against the alignment member 200.

Figure 5:
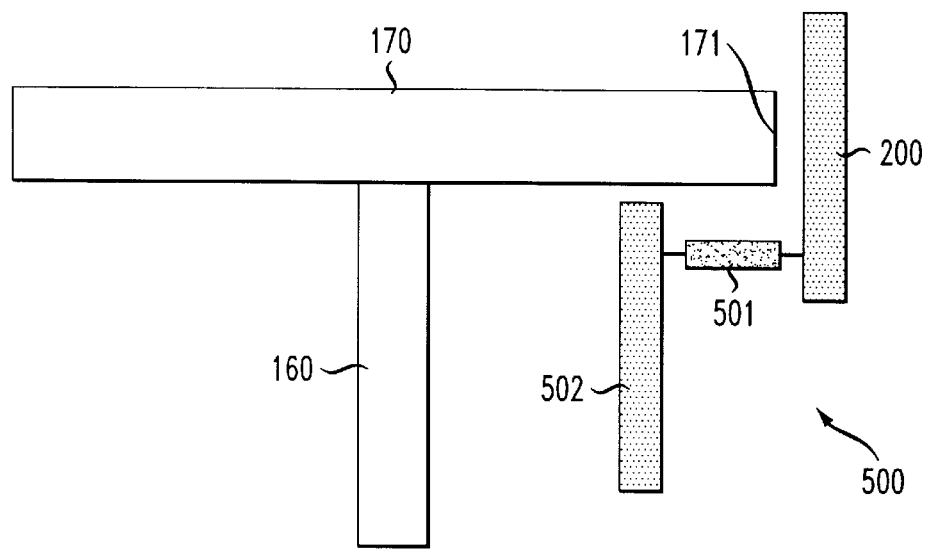
FIG. 5 illustrates a plan view of a hydraulic cylinder used to attach the polishing pad alignment device to the platen.

Turning now to FIG. 5, there is another embodiment of a polishing pad alignment device 500, which shows the alignment member 200 removably positionable against the wall of the platen 171. In this particular embodiment, the alignment member 200 may be positioned and held against the wall 171 using a hydraulic cylinder 501. The hydraulic cylinder 501 and the alignment member 200 may be supported separately from the platen 170 by a support member 502. As illustrated, the hydraulic cylinder 501 cooperatively connects the alignment member 200 to the support member 502. The hydraulic cylinder 501 may be a pneumatic or fluid operated cylinder that can be operated to move the alignment member 200 against and away from the wall 171 when desired. Of course, those who are skilled in the art understand that the hydraulic cylinder 501 may be operated remotely and may include the pump and fluid lines (not shown) necessary to operate the hydraulic cylinder 501. Additionally as those who are skilled in the art will appreciate that while a hydraulic cylinder 501 has been illustrated and discussed, other mechanical devices, such as motor driven expandable scissor mechanisms or motor driven screw mechanisms, are also within the scope of the present invention.

Figure 6:
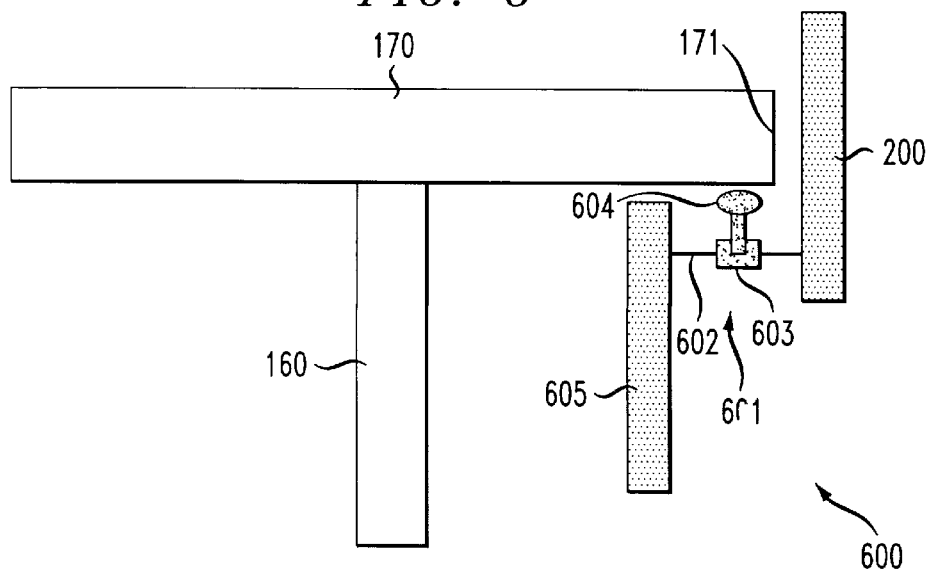
FIG. 6 illustrates a plan view of a retractor device used to attach polishing pad alignment device to platen.

Referring now to FIG. 6, there is illustrated another embodiment of a polishing pad alignment device 600. In this figure, the polishing pad alignment device 600 includes a manual retractor device 601 that can be used to position and the alignment member 200 against the wall 171 of the platen 170. The retractor device 601 may take a number of mechanical configurations. For example, the retractor device 601 may include a slide arm 602 with a cooperative eyelet 603 and retaining bolt 604, which are supported by a support member 605. Then alignment is not necessary, the retaining bolt 604 may be loosened to allow the slide arm 602 to slide through the eyelet 603 in a position away from the platen 170 to allow it to spin freely. Alternatively, when alignment of a polishing pad is desired, the retaining bolt 604 may be loosened to allow the slide arm 602 to slide through the eyelet 602 in a position against the wall 171 of the platen 170, after which, the retaining bolt 604 may be again tightened to hold the alignment member 200 in place.

Figure 7:
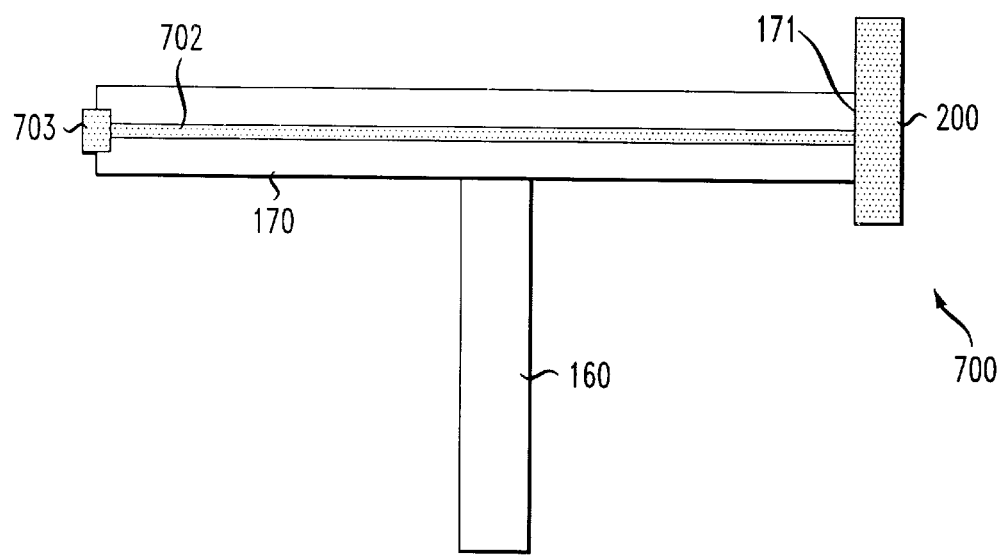
FIG. 7 illustrates a plan view of polishing pad alignment device, where the alignment member is attached to the platen using a band.

Referring now to FIG. 7, illustrated is a plan view of another embodiment of the polishing pad alignment device 500 where the alignment member 200 is attached to the platen 170 using a band 502 that wraps around 170 to an opposing side of the platen 170, which in this embodiment comprises a metal and held in place with a magnet 703. The magnet 703 magnetically retains the alignment member 200 against the wall 171 of the platen 170. The magnet may serve as an opposing counter-balance weight if the operator chooses to leave the alignment member 200 attached to the platen 170 during the polishing process, or an additional counter-balance weight may be used, if so needed.

Figure 8:
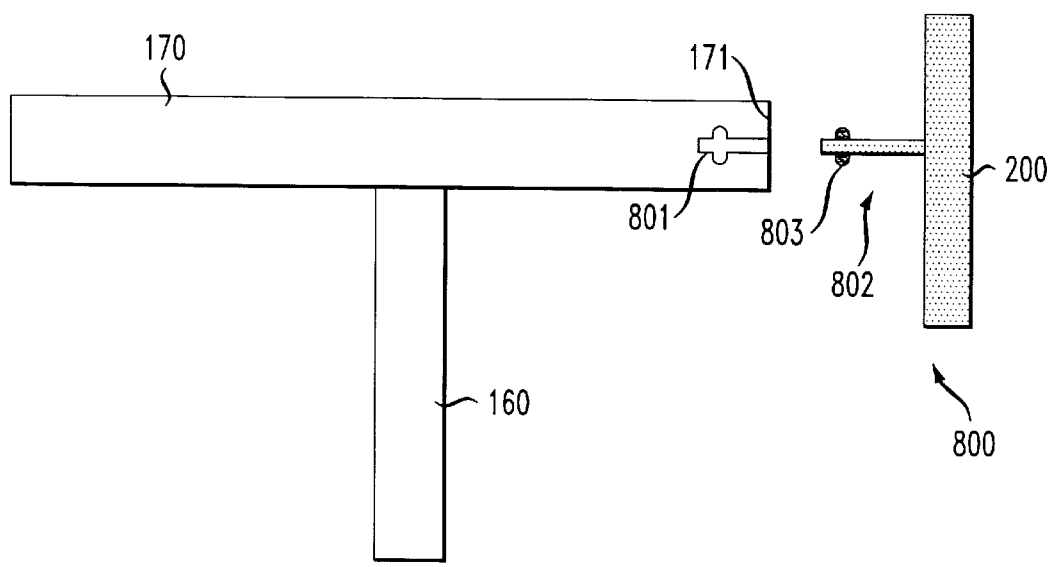
FIG. 8 illustrates a sectional view of polishing pad alignment device where a spring biased locking ball and a corresponding pin receptacle are used to attach alignment member to platen.

In an alternative embodiment as illustrated in FIG. 8, the polishing pad alignment device 800 could also be a pin 802 coupled to the alignment member 200. In such embodiments, the pin 802 is configured to be cooperatively received in a corresponding pin receptacle 801 formed in the wall 171 of the platen 170. The pin 802 may be straight or threaded, in which case, the receptacle 801 would be straight or threaded. Alternatively, the pin 802 could also be a locking pin, such as a spring-biased pin locking ball 803, that engages a ball cavity serving as the corresponding pin receptacle 801. The groove formed in the receptacle allows the spring-biased locking ball 803 to lock into the corresponding pin receptacle 801. The spring-biased locking ball 803 slides into the corresponding pin receptacle 801 and locks into the corresponding pin receptacle 801 to removably attach and position the alignment member 200 against the platen 170.

Figure 9:
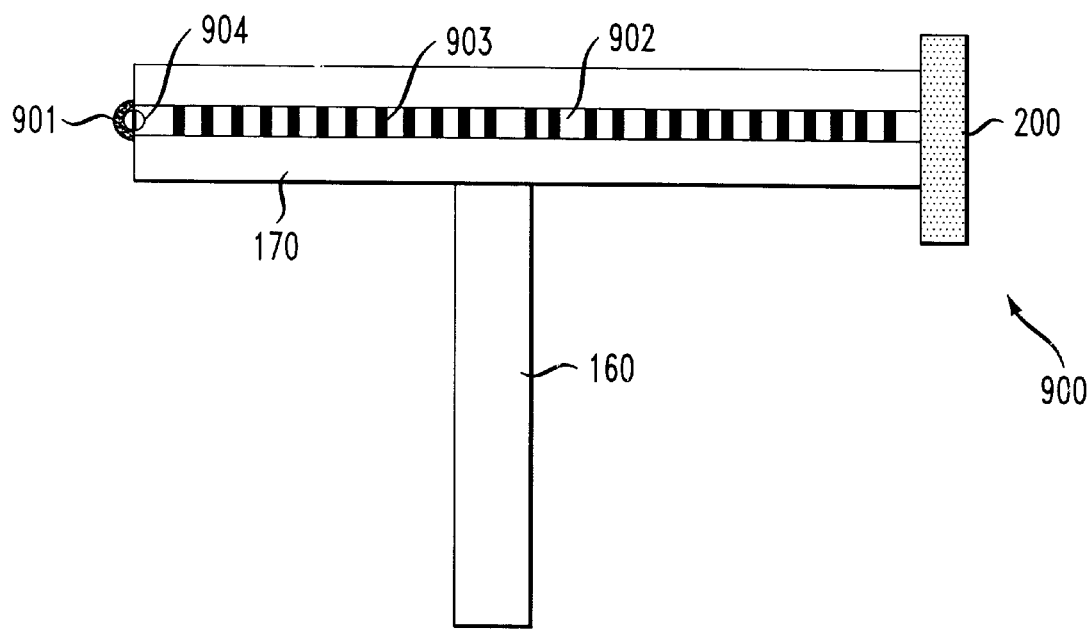
FIG. 9 illustrates a sectional view of alignment member that is attached to the platen by a clamp.

FIG. 9 illustrates yet another embodiment of the polishing pad alignment device 900. In this particular embodiment, the alignment member 200 is held place by a slotted band member 902 having a screw 904 that draws the slotted band member 902 through a screw housing 906. This particular embodiment is similar to a slotted band hose clamp, which is well known. In one embodiment, the slotted band member 902 comprises two bands that have one end attached to opposing sides of the alignment member 200. Each slotted band member 902 has a length that is sufficient to extend around the platen 170 and meet at the screw housing 906, which will typically be attached to the free end of one of the slotted band members 902. The free end of the other slotted band member 902 can then be inserted into the screw housing 906, after which the screw 904 can be rotated to either tighten the slotted band member 902 against the platen 170 or loosen it, depending on the desired operation.

One who is skilled in the art will readily recognize that the use of the polishing pad alignment devices as described above may be applied to all phases of semiconductor manufacture requiring CMP, e.g., substrate, dielectric layer, or metal layer planarization. Of course, the present invention is also applicable to the planarization of other materials that are yet to be employed in semiconductor manufacture. Accordingly, a polishing pad alignment device has been described that facilitates the process of adhering a polishing pad onto the polishing platen by eliminating the need to repeatedly realign the polishing pad while pasting the polishing pad to the platen. Thus, the alignment member reduces the down time for the CMP apparatus and significant labor costs and lost production.

Although the present invention has been described in detail, those skilled in the art should understand that they can make various changes, substitutions and alterations herein without departing from the spirit and scope of the invention in its broadest form.

What is claimed is:

1. A polishing pad alignment device, comprising:
   an alignment member removably positionable against a side wall of a platen, the alignment member having a height sufficient to extend above a top surface of the platen when positioned against the wall of the platen; and
   an attachment device configured to attach the alignment member to the platen, wherein the attachment device is a pin coupled to a wall of the polishing pad alignment member, the pin being configured to be cooperatively received in a corresponding pin receptacle in the wall of the platen.

2. The polishing pad alignment device as recited in claim 1 wherein the alignment member is an arcuate member having an arc substantially equal to an arc of the platen.

3. The polishing pad alignment device as recited in claim 1 further including a retractor device that couples the polishing pad alignment device to the platen, the retractor device including a counter-balance weight attachable to the wall of the platen on an opposing side of the platen.

4. The polishing pad alignment device as recited in claim 3 wherein the retractor device is a piston, a hinge, or a slide arm with a cooperative eyelet and retaining bolt.

5. A method of alignment a polishing pad on a platen, comprising:
   positioning an alignment member against a side wall of a platen, the alignment member having a height sufficient to extend above a top surface of the platen when positioned against the wall of the platen;
   positioning an edge of the polishing pad against the alignment member; and
   positioning the polishing pad on the platen as the edge is positioned against the alignment member.

6. The method as recited in claim 5 wherein positioning the alignment member includes positioning an arcuate portion of the alignment member against an arcuate portion of the platen that is substantially equal to the arcuate portion of the alignment member.

7. The method as recited in claim 5 wherein positioning the alignment member includes removably attaching the alignment member to the wall of the platen with an attachment device.

8. The method as recited in claim 7 wherein removably attaching includes inserting a pin coupled to the alignment member into a corresponding pin receptacle in the wall of the platen.

9. The method as recited in claim 7 wherein removably attaching includes magnetically attaching the polishing pad alignment device against the wall of the platen.

10. The method as recited in claim 7 wherein removably attaching includes cooperatively engaging a latch coupled to the alignment member with a corresponding latch receptacle on the wall of the platen.

11. The method as recited in claim 5 wherein positioning the alignment member includes positioning the alignment member with a retractor device that couples the polishing pad alignment device to the platen, the retractor device including a counter-balance weight attachable to a wall of the platen on an opposing side of the platen.

12. The method as recited in claim 11 wherein positioning includes positioning with a retractor device that is a piston, a hinge, or a slide arm with a cooperative eyelet and retaining bolt.

13. A polishing pad alignment device, comprising:
   an alignment member removably positionable against a side wall of a platen, the alignment member having a height sufficient to extend above a top surface of the platen when positioned against the wall of the platen; and
   an attachment device configured to attach the alignment member to the platen, wherein the attachment device is a magnet that magnetically retains the polishing pad alignment device against the wall of the platen.

* * * * *